United States Patent [19]

Markham

[11] Patent Number: 5,512,133
[45] Date of Patent: Apr. 30, 1996

[54] METHOD FOR DEINKING RECYCLED PAPER USING A LOW FLOW ELONGATED OPEN TOP FLOTATION VESSEL

[75] Inventor: Larry D. Markham, Mobile, Ala.

[73] Assignee: International Paper Company, Purchase, N.Y.

[21] Appl. No.: 283,589

[22] Filed: Aug. 1, 1994

[51] Int. Cl.⁶ .................................................. D21B 1/08
[52] U.S. Cl. ................................ 162/4; 162/55; 209/164; 209/168; 210/703
[58] Field of Search .................................. 210/703, 707, 210/150, 151; 209/164, 168, 169, 165, 170; 162/4, 5, 6, 7, 8, 55

[56] References Cited

U.S. PATENT DOCUMENTS

| | | | |
|---|---|---|---|
| 3,557,956 | 1/1971 | Braun et al. | 210/84 |
| 4,076,578 | 2/1978 | Puddington et al. | 162/5 |
| 4,219,381 | 8/1980 | Schnell | 162/4 |
| 4,331,534 | 5/1982 | Barnscheidt | 209/164 |
| 4,332,638 | 6/1982 | Mauer et al. | 162/4 |
| 4,368,101 | 1/1983 | Bahr et al. | 162/4 |
| 4,425,232 | 1/1984 | Lawrence et al. | 210/219 |
| 4,548,673 | 10/1985 | Nanda et al. | 162/4 |
| 4,704,201 | 11/1987 | Keck et al. | 209/17 |
| 4,726,880 | 2/1988 | Smith | 162/4 |
| 4,749,473 | 6/1988 | Shioiri et al. | 209/164 |
| 4,780,179 | 10/1988 | Clement et al. | 162/5 |
| 4,915,821 | 4/1990 | Lamont et al. | 209/17 |
| 4,952,308 | 8/1990 | Chamberlin et al. | 209/170 |
| 5,028,315 | 7/1991 | Cruea et al. | 209/164 |
| 5,102,500 | 4/1992 | Darlington | 162/5 |
| 5,131,980 | 7/1992 | Chamblee et al. | 162/4 |
| 5,133,832 | 7/1992 | Gilkey | 162/4 |
| 5,141,598 | 8/1992 | Richman et al. | 162/5 |
| 5,167,798 | 12/1992 | Yoon et al. | 209/170 |
| 5,200,034 | 4/1993 | Richmann et al. | 162/5 |
| 5,217,573 | 6/1993 | Tsai et al. | 162/5 |
| 5,340,439 | 8/1994 | Markham et al. | 162/5 |

FOREIGN PATENT DOCUMENTS

3116905A1  11/1982  Germany.

OTHER PUBLICATIONS

Chemical Engineers' Handbook, Fifth Edition (1973), Robert H. Perry, Consultant, McGraw–Hill Book company, pp. 21–65 to 21–69.

*Primary Examiner*—David L. Lacey
*Assistant Examiner*—Dean T. Nguyen
*Attorney, Agent, or Firm*—Luedeka, Neely & Graham

[57] ABSTRACT

A method for producing substantially ink-free pulp from recycle printed paper comprising first pulping the recycle paper in a hydrapulper with at least water and an agglomerating agent thereby producing a pulp. Ink particle agglomerates in the pulp are then removed by screening the pulp through at least one screen and by cleaning the pulp in a cyclone cleaner. Pulp together with small ink particles that escape the prior separation stages is then conducted from the cyclone cleaner through a standpipe at a consistency of about or less than 1% where particles of ink associate with small air bubbles and are elevated to the surface of the pulp where they accumulate as a froth which may be removed by overflowing. The process substantially reduces the amount of ink particles in recycled pulp as compared with conventional agglomeration deinking methods without the expense and complexity of traditional flotation cells, and also greatly reduces the amount of fiber loss associated with ink particle separation using conventional flotation methods.

10 Claims, 3 Drawing Sheets

METHOD FOR DEINKING RECYCLED PAPER USING A LOW FLOW ELONGATED OPEN TOP FLOTATION VESSEL

FIELD OF THE INVENTION

The present invention relates to methods for removal of ink from recycled paper. More specifically, the invention relates to methods which involve agglomerating ink particles in a pulp slurry and then separating the agglomerated particles from the slurry.

BACKGROUND OF THE INVENTION

As used herein, "ink" means any of the inks, toners or the like used by commercial printing presses, laser and impact printers, xerographic copiers or any other type of printer or copier which affixes ink, toner or the like to a cellulosic fiber substrate and wherein the ink or toner is separable from the substrate in a recycling process for recovery of the fibers.

The amount of paper and other cellulosic fiber substrates printed with electrostatic toners continues to increase as low cost laser printers and xerographic copiers become more common. As a result, electrostatic printed papers are becoming a more important fiber source for recycling mills.

Conventional ink removal processes of washing or flotation are often inadequate to the task of removing electrostatic toner ink from the fibers. The toner particles removed from the repulped fibers during conventional processes are usually flat flakes which are difficult to separate from the fiber component.

Thus, recycled papers prepared from waste papers printed with laser printers or xerographic copiers often have higher dirt counts than similar grades of recycled paper prepared from waste paper printed using other techniques. Generally speaking, as the dirt count of the recycled paper goes up, the value of the paper goes down.

Office waste is a major source of waste paper. Since businesses use a variety of printers themselves, and receive many types of printed paper, the paper received at the recycling mill often contains a variety of papers printed with a variety of inks. The inks from papers printed with more difficult to remove inks will contaminate the recycled fibers of those papers which were printed with other types of inks. For example, when papers printed with electrostatic toners are mixed with papers printed by other methods, paper prepared from the waste pulp will often have higher dirt counts than papers prepared exclusively from waste papers printed by other methods. Therefore, papers printed with inks such as electrostatic toners are not only difficult to recycle, but they may gradually contaminate the paper supply if the ink is not separated from the pulp.

The present technology for removing ink from waste paper uses one of two basic approaches. One approach is to disperse the ink particles into the pulp slurry and remove the particles from the pulp by washing and flotation technology. Washing is carried out by filtering off the fibers, while allowing the filtrate containing the ink particles to pass through the filter. Flotation is carried out by mixing air bubbles into the pulp slurry, then introducing the slurry into large flotation cells where the froth of ink and air rises to the surface, and skimming of the froth. Washing technology generates large amounts of waste water and has high losses of 10–30% of the incoming waste paper. Flotation technology is expensive, difficult to operate and has high losses of 10–15%. Operating problems with commercial flotation cells include pulp channelling, air channelling and air nozzle plugging. The pulp mass may be further processed by washing to prepare it for papermaking.

The other approach is to agglomerate the ink into particles large enough to be separated from the pulp slurry using a screen with slots dimensioned to pass the fibers while capturing the ink particles and using centrifugal cleaners which remove the ink particles based on their higher specific gravity. A problem with the agglomeration method is that the agglomerated ink particles are often not of uniform size so that a portion of the particles are sufficiently small to pass through the screen and the centrifugal cleaners. These particles eventually end up contaminating the paper made from the recycled pulp, and producing paper having a high speck content, a low brightness, or an unwanted shade of color. This problem is particularly evident with papers printed with inks which do not agglomerate well and which produce more smaller or finer particles which may escape the screens and cleaners.

It is therefore an object of the present invention to provide a method for making pulp produced using secondary fiber originating from recycled printed paper.

It is another object of the invention to provide a method for separating ink from printed recycled paper by agglomeration of ink particles released from paper in the repulping process.

Yet another object of the invention is to provide an improved agglomeration deinking process for use in recycling printed paper.

Another object of the invention is to provide an improved agglomeration deinking process which is effective in removing fine ink particles which may escape the standard separation stages.

Still another object of the present invention is to provide a method for producing brighter papers prepared from recycled papers printed with various inks.

An additional object of the invention is to provide an improved agglomeration deinking process and associated apparatus which is relatively simple to use.

SUMMARY OF THE INVENTION

Having regard to the above and other objects and advantages, the present invention relates to a method for recycling printed paper by agglomeration deinking. The method comprises repulping waste paper in a hydrapulper or other pulping machine with water and an agglomerating agent thereby producing a pulp slurry containing water, cellulosic wood fibers and ink particle agglomerates which include relatively small ink particles of about or less than the size of the wood fibers and ink particle agglomerates substantially larger than the wood fibers. Ink particle agglomerates are separated from the pulp slurry such as by screening the slurry through a screen so that a pulp slurry filtrate is passed through the screen containing water, wood fibers and relatively small ink particles, and relatively larger particle agglomerates are captured on the screen. The filtrate is then passed through a cyclone cleaner at a consistency of about or less than 1% wherein relatively small ink particles are separated from the filtrate to provide a cleaned pulp slurry filtrate of water, wood fibers and residual ink particles and a contaminated pulp slurry or reject stream containing a higher concentration of ink particles. The cleaned pulp slurry is conducted from the cyclone cleaner to a vertically oriented elongate vessel, preferably a standpipe, having vertically spaced apart inlets and outlets. The pulp slurry is conducted through the vessel in a generally downward vertical direction, preferably in a vertically oriented spiral or swirling flow pattern, so as to cause residual ink particles to associate with gas bubbles in the slurry. The ink particles are carried by the bubbles to an upper surface of the slurry in the vessel where the particles accumulate as a froth adjacent the upper surface. The froth is removed and the pulp slurry is further processed as necessary for use in supplying pulp in a papermaking furnish. In one embodiment of the invention, the reject stream from the cyclone cleaners may be directed to a standpipe for separation of the ink particles therefrom.

In a preferred embodiment of the invention, the steps of the method after the hydrapulper and screen are repeated at least once. This may be accomplished by using cyclone cleaning followed by the standpipe treatment with the sequence repeated. Also, while air may be added, it is a feature of the invention that sufficient fine air bubbles for association with the ink particles may generally be generated through the action of the cyclone cleaner and pumping the slurry to the standpipe. The turbulence associated with these steps inherently breaks down air bubbles entrained in the pulp slurry and additional air is generally introduced as entrained bubbles in the dilution water which is added to reduce the pulp consistency.

In another preferred embodiment of the invention, the pulp slurry is maintained at a consistency in the range of from about 0.3% to about 0.7%, and most preferably in the range of from about 0.4% to about 0.6%, upon its delivery to the separation vessel.

Alkali may be added during the repulping of the waste paper, and the alkali is preferably selected from the group consisting of sodium hydroxide, sodium carbonate, sodium bicarbonate, potassium hydroxide, lime, white liquor, green liquor and black liquor.

BRIEF DESCRIPTION OF THE DRAWINGS

The above and other features and advantages of the invention will become further known from the following detailed description of preferred embodiments of the invention in conjunction with the drawings in which.

DETAILED DESCRIPTION OF THE INVENTION

Figure 1:
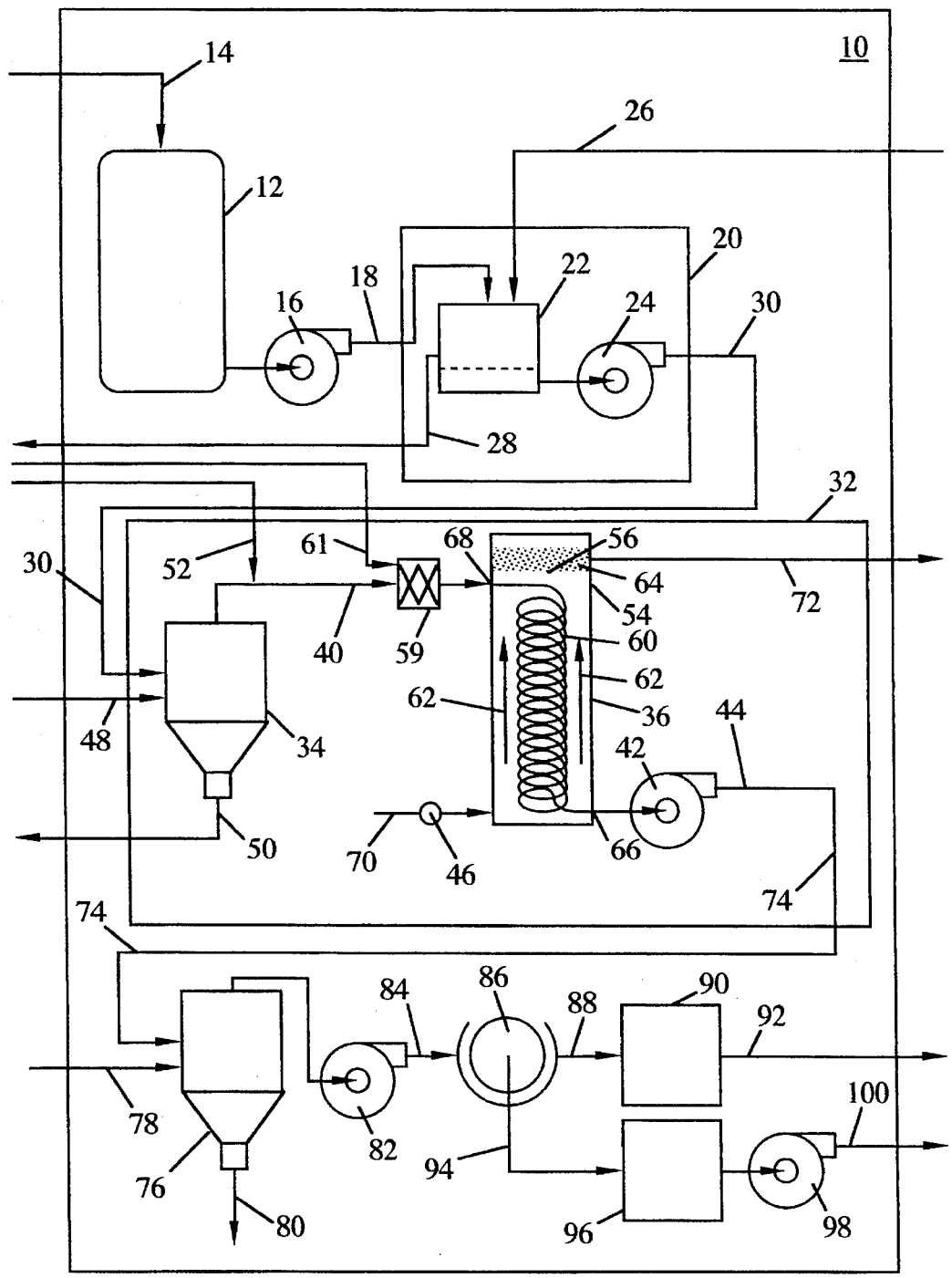
FIG. 1 is a diagrammatic view illustrating an embodiment of a recycle paper pulping and deinking system according to the present invention.

Referring now to the drawings in which like reference characters designate like or corresponding parts throughout, a recycle paper pulping and deinking system 10 which may be used in practicing the present invention is illustrated in FIG. 1. In the exemplary system 10, printed waste paper or other fiber containing material containing ink to be recycled is fed into a hydrapulper 12 as at 14 and combined with water and an agglomerating agent in any of the conventional methods. Depending on the nature of the paper and other factors known to those of ordinary skill, alkali may be added to the repulping slurry to assist in breaking down the paper into discrete fiber.

The fibrous material is processed in the hydrapulper 12 for a sufficient time under conditions sufficient to substantially convert the material into a pulp slurry which is removed from the hydrapulper 12 as by a pump 16 through the conduit 18 and transferred to a screening stage 20. The basic operation of a hydrapulper is well known to those of ordinary skill, and will not be discussed in great detail here except to note that the repulping process effects disintegration of the fibrous cellulosic material by a combination of mechanical defibration through agitation induced by the action of the rotor and turbulence in the swirling material, and chemical action of the water and any added alkali in the slurry, producing individual cellulosic fibers or small fiber clumps which are finely dispersed in the resulting slurry. The ink is likewise substantially disintegrated from the fibrous material and dispersed in the slurry, and may undergo a degree of size reduction due to the mechanical and chemical forces associated with the pulping process.

There are a variety of agglomerating agents currently available to the practitioner in this field. Many of these agglomerating agents are surfactants which make the ink hydrophobic and induce a tendency to agglomerate. Examples of effective agglomerating agents are the surfactant sold under the tradename PM-201 by PPG Industries of Pittsburgh, Pa. and the surfactant/dispersant blend sold under the trademark BRD 2311 by Buckman Laboratories, Memphis, Tenn. Agglomerating agents may also comprise polymeric materials which act as collectors to increase the size of the agglomerates such as the PX-101 by PPG Industries. Any of these or other agglomerating agents currently available may be used in the present invention. One may generally obtain satisfactory results using from about 0.3 to about 2.0 wt % agglomerating agent The process of agglomeration of ink particles has also been referred to as "aggregation", "densification" or "dispersion", but all describing the same process. (See J. K. Borchardt, Proceedings of the TAPPI 1993 Pulping Conference, page 839).

The screening stage 20 comprises one or more screens 22 and one or more pumps 24. The operation of a separation screen in an agglomeration deinking system is well known in the art and will not be repeated here in detail. In general, the screen 22 may have slots of a width in the range of from about 0.002 inches to about 0.014 inches. The screening stage 20 can be preceded by a coarse screening stage for removal of larger contaminants. In agglomeration deinking, the ink has a strong tendency to attach to larger contaminants such as plastic, so that even coarse screening having a typical hole size of 0.040"–0.080"can remove a significant amount of ink. The pulp slurry is preferably introduced into the screening stage 20 at a consistency in the range of from about 0.5to about 3.5% which may be achieved by the addition of dilution water from conduit 26. The pulp slurry passes through the screen 22 with a portion of the agglomerated ink particles being trapped in the screen 22 and eventually being flushed out as rejects as in conduit 28. The accepts or filtrate from the screen 22 are the wood fiber, water, relatively small ink particles and ink particle agglomerates, and other materials which pass through the screen 22. The pulp slurry may be processed through multiple screens in the stage 20, including secondary, tertiary and quaternary screens for recovery of fiber. The filtrate is then transferred with the assistance of pump 24 through conduit 30 to a cyclone cleaner/flotation stage 32.

The cleaner/flotation stage 32 comprises a cleaner section 34 containing one or more cyclone cleaners, and, in a preferred embodiment, a standpipe 36 which is a preferred vertically oriented elongate vessel for use in practicing the invention. The slurry is transferred from the cleaner section 34 to the standpipe 36 as by the conduit 40. A pump 42 transfers the slurry from the standpipe 36 in the conduit 44 to the following processing stage.

The screen accepts stream enters a cyclone cleaner section 34 where the consistency of the pulp slurry is adjusted as necessary by dilution water as from the conduit 48 to a preferred consistency in the range of from about 0.3% to about 0.7%. The operation of cyclone cleaners is believed to be well known by those of ordinary skill, and will not be described in detail. By the action of the cleaner section 34, more dense agglomerated ink particles are forced to the sides of the cyclone cleaner 34 and out the bottom as rejects through the conduit 50. The less dense fibers with residual ink particles and water remain substantially in the center of the cleaner 34 and are removed from the cleaner 34 as accepts in conduit 40.

The cleaned pulp (accepts from the cyclone cleaners) is then transferred from the cleaner 34 to the standpipe 36 through conduit 40, with adjustment of the consistency of the pulp slurry as necessary from water supply conduit 52, to a consistency in the range of from about 0.3to about 0.7%. In this regard, it is noted that the consistency of the pulp slurry throughout the system after the screen is preferably maintained at about or less than about 1%, particularly in the standpipe 36, and that the 0.3% to 0.7% range is particularly preferred. It is especially preferred that the consistency of the pulp slurry at least in the standpipe 36 be at about 0.5%. It will be appreciated that conventional flotation cells operate at about 1.2% consistency or higher. Although the mechanism is not fully understood, it is believed that dilution to the consistency used in the invention materially improves separation of the ink particles from the slurry, apparently enhancing association of the hydrophilic ink particles with the air bubbles.

Figure 2A:
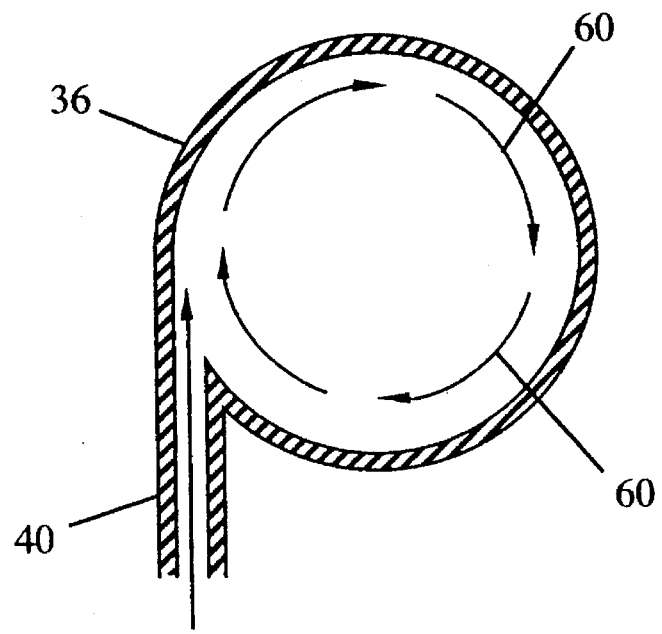
FIG. 2a is a diagrammatic illustration of the flow of a pulp slurry from a cyclone cleaner into the top of a standpipe wherein the slurry is introduced tangentially to the wall of the standpipe and FIG. 2b is a cross-sectional drawing of the flow of a pulp slurry from a cyclone cleaner into the top of a standpipe wherein the slurry impinges on a baffle to direct the flow of the slurry in a direction tangential to the wall of the standpipe.
Figure 2B:
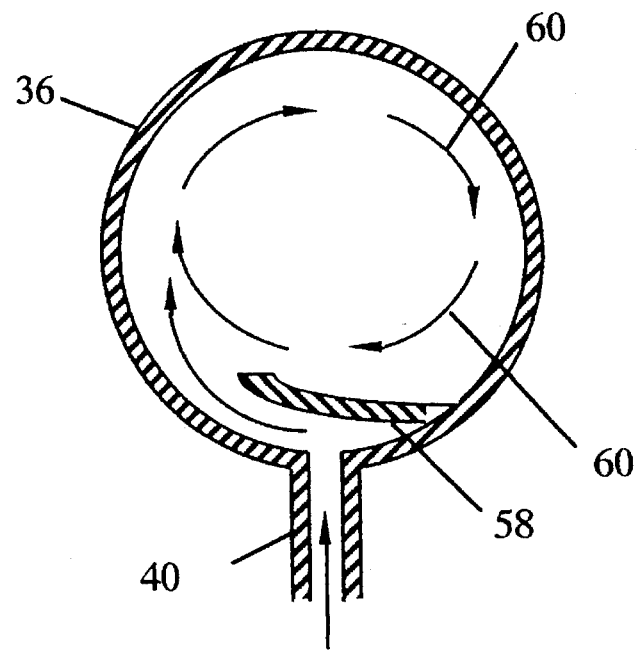

In a preferred embodiment, the pulp slurry from conduit 40 enters a standpipe 36 adjacent its upper end 54 and is introduced by an opening located a short distance below the upper surface 56 of the slurry in the standpipe 36 using an arrangement which causes the flow of the slurry into the standpipe 36 to be generally tangentially directed along the inner cylindrical wall of the standpipe 36. This may be accomplished, for example, by connecting the conduit 40 to the standpipe 36 such that its orientation at the connection to the standpipe 36 is generally tangential as indicated graphically in FIG. 2a, or by using a baffle plate 58 as shown in FIG. 2b, to thereby cause the flow into and through the standpipe 36 to occur in a vertical spiral or swirling flow pattern as indicated graphically by spiral 60.

Thus, in a preferred embodiment, the pulp slurry from the cyclone cleaner 34 swirls downwardly in the standpipe 36, preferably in a relatively gentle manner without generation of substantial turbulence, and entrained air or gas bubbles rise to the top generally countercurrently as indicated by the direction of arrows 62. Preferably, the dimensions of the standpipe 36 in conjunction with the mass flow rate of the pulp slurry are such that the pulp slurry has a residence time of from about 10 to about 60 seconds within the standpipe, most preferably about 30 seconds. At a typical standpipe velocity in the range of about one-half foot per second, the pulp slurry residence time would be about 24 seconds for a typical 12 ft. tall standpipe. The diameter of the standpipe is determined by the planned flow rate of the pulp slurry. By a suitable arrangement of valves and dimensioning of the various conduits together with a level sensor, flow control may be accomplished so that the upper level of the slurry in the standpipe is maintained substantially constant while achieving the desired throughput rate. In a particularly preferred embodiment, the standpipe has a height of about 12 ft., and is configured to cause the upper level of the slurry to be maintained a few inches below the foam overflow point with the opening for introduction of flow located about 2 ft. below the upper surface of the pulp slurry.

During the time the pulp slurry is in the standpipe 36, small ink particles or ink particle agglomerates which have been rendered hydrophobic by the agglomerating agent attach to small air bubbles in the pulp slurry, which then carry the particles and agglomerates toward the surface of the pulp slurry in the standpipe 36. Typical places in the system 10 where air bubbles are generated include the hydrapulper 12, any intermediate pulp storage tanks in the system, the pulp thickener filtrate which is used as dilution water added throughout the system 10, pumps, orifices and the cyclone cleaners. Thus, the system 10 may not require the addition of air bubbles to the pulp slurry at any point in order to function satisfactorily. The presence of inherent leaks and turbulent air/slurry interfaces are believed to be sufficient to produce the small air bubbles needed to attract and remove to the surface 56 the small ink agglomerates and particles which escape the previous stages. However, if desired, air may be added to the pulp slurry at any point prior to the standpipe or even in the standpipe itself, such as by placement of a static in-line mixer 59 in conduit 40 with an air bleed-in line 61 for introduction of air if necessary.

The combination of the air bubbles and small ink particles with the rising air bubbles forms a froth layer 64 adjacent the surface 56 of the pulp slurry in the standpipe 36. Thus, the agglomerating agent contributes synergistically to promote the creation of larger masses of ink which more readily separate in the conventional separation stages, and also to make the ink particles more hydrophobic thereby promoting association of the particles with air bubbles in the standpipe 36 which rapidly elevate the small ink particles in the pulp slurry to the upper froth layer 64 in the standpipe 36.

Also, because the agglomerating agent substantially reduces the number of ink particles through attachment of the particles to each other, and produces particles of a sufficient size to be removed in the screens, a much smaller number of ink particles remain to be removed in the standpipes so that a very small volume of air generally is sufficient for their removal, and air does not need to be added beyond the volume of entrained air which is already present. Moreover, the agglomerated ink particles are spherical in shape rather than flat, which improves their removal by the air bubbles.

Therefore, a retention time of only 10–60 seconds in the standpipe 36 is sufficient for very efficient ink removal, whereas conventional flotation deinking systems require much longer flotation times of 5–15 minutes.

It is also believed that the presence of the agglomeration chemical promotes attainment and/or stabilizes the dispersion of fine air bubbles in the slurry needed for association with fine ink particles. Also, the low consistency used in the process is believed to reduce the amount of fiber which may otherwise be lost to the froth with the ink particles by weakening the fiber network so that fewer fibers are lifted to the surface.

Another factor believed to be associated with the enhanced ink removal of the invention is that the spherical ink particle are able to pass upwards through the fiber network with less drag on the fibers than a flat ink particle. The result is a froth or foam which is very concentrated with ink and dark in color, with very little fiber. The low consistency is further believed to reduce the tendency of air bubbles to become entrapped with the fibers so that more fine air bubbles are available to transport the ink particles to the surface. The unexpectedly high ink removal in the foam even without the addition of air is believed to result from the synergistic combination of the agglomeration chemistry and the low pulp consistency.

The standpipe 36 for practicing the present invention is also preferably equipped with a dilution water stream 70 and valve 46 in order to assist in maintaining control of the level in the standpipe and to promote a high removal efficiency. Additionally, valve 46 may be adjusted to cause the standpipe 36 to overflow, either periodically or continuously, for the removal of the froth 64 adjacent the surface 56 of the pulp slurry in the standpipe 36 as rejects which are directed from the standpipe in the conduit 72. The froth 64 may be also be continuously or intermittently removed by the use of a skimmer or the like.

The control provided by valve 46 is preferably such that there is relatively little pulp lost in the process. In this regard, it is noted that losses of the valuable wood fiber element in the separation stage 32 of the invention are generally in the range of from about 0.1% to about 2%, while the fiber losses in traditional flotation cells in deinking systems are in the range of from about 10% to about 15%. The accepts pulp slurry from the standpipe 36 is the fiber and water not removed from the pulp slurry as froth, with a much improved quality both in terms of the ink particle content and in the pulp brightness. If it is desired to increase the amount of froth, an additional dosage of agglomeration chemical or alternatively a separate frothing agent may be added ahead of the standpipe.

The pulp slurry from the cleaner/flotation stage 32 is transferred as by the conduit 74 to either additional cleaner/flotation stages corresponding substantially to the stage 32 or to a final cyclone cleaner 76 which functions in a manner similar to the cyclone cleaner 34 of the cleaner/flotation stage 32. Again, the consistency of the pulp is preferably adjusted as necessary with dilution water from the conduit 78 to a preferred consistency in the range of from about 0.3% to about 0.7%. Ink particles in the pulp slurry are forced to the sides of the cyclone cleaner 76 and out the bottom as rejects through the conduit 80. The less dense fibers and water remain substantially in the center of the cleaner 76 and are removed from the cleaner 76 as accepts pulp slurry. The pulp slurry is then transferred as by a pump 82 in conduit 84 to a pulp thickener 86 where the consistency of the pulp is increased to a range of from about 5% to about 25%, and the excess water from the pulp slurry removed as filtrate. The operation of a pulp thickener is well known to those of ordinary skill and will not be described in detail here.

The pulp, now at a high consistency, may be transferred from the pulp thickener 86 through conduit 88 to pulp storage indicated generally at 90 for later use in papermaking, or be transferred through the conduit 92 to a furnish tank (not shown). The filtrate from the pulp thickener 86 is transferred through the conduit 94 to a filtrate tank 96 where it is stored for use as dilution or make-up water. The filtrate therefore may be transferred through conduit 100 as by pump 98 back to the hydrapulper 12, the screening stage 22, the cyclone cleaner 34 and cleaner 76, and/or the standpipe section 36.

Figure 3:
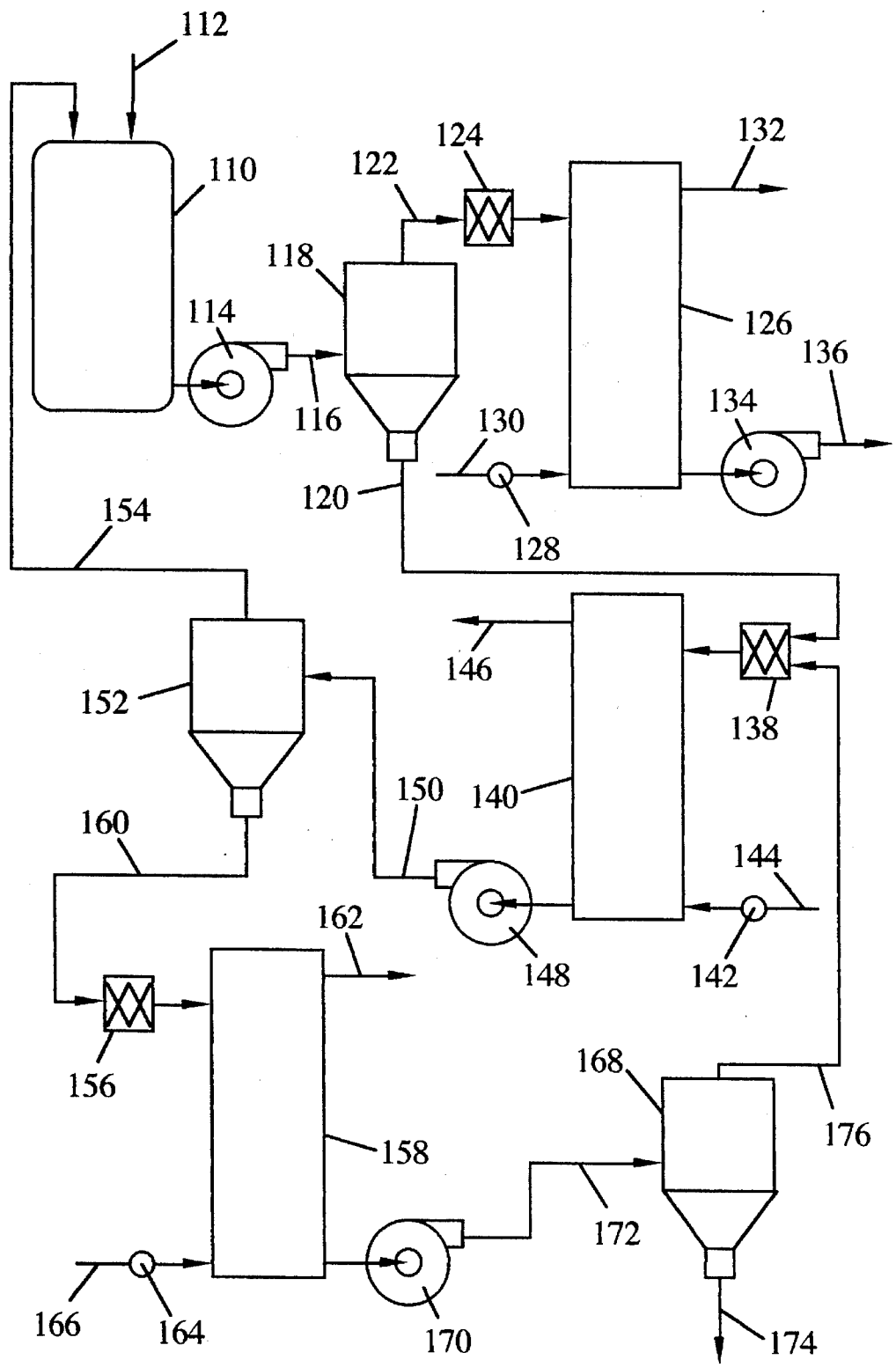
FIG. 3 is diagrammatic view illustrating another embodiment of the invention wherein the cleaning stages are arranged in a cascade arrangement.

FIG. 3 is a diagrammatic view illustrating another embodiment of the invention wherein the cleaning stages are cascaded. The fibrous material is repulped and screened in a manner similar to that described above with respect to FIG. 1. The slurry is fed after repulping and screening into a pulp feed tank 110, via the conduit 112.

The pulp slurry is removed from the pulp feed tank 110 as by a pump 114 through the conduit 116 to a primary cyclone cleaner 118. By the action of the cleaner 118, the more dense agglomerated ink particles are forced to the sides of the cleaner 118 and out the bottom as primary rejects through the conduit 120. The less dense fibers with residual ink particles and water remain substantially in the center of the cleaner 118 and are removed from the cleaner as primary accepts through the conduit 122.

The primary accepts pass through a static mixer 124 and then into the primary standpipe 126. The operation of the standpipe 126 is similar to the operation of the standpipe 36 described hereinabove. The level in the standpipe 126 is adjusted by controlling the valve 128 in the water supply conduit 130. The foam containing ink particles from the primary accepts is discharged through the conduit 132. The cleaned pulp slurry from the primary standpipe 126 is transferred for further processing using the pump 134 and the conduit 136.

The primary rejects from the primary cyclone cleaner 118 pass through the conduit 120, feed into the static mixer 138 and, thence, into the secondary standpipe 140. As previously described hereinabove, the level in the standpipe 140 is controlled by the valve 142 in the water supply line 144. The foam developed in the standpipe 140 is discharged through the conduit 146 and the cleaned pulp is transferred by the pump 148 through the conduit 150 to the secondary cyclone cleaner 152.

The action of the secondary cyclone cleaner 152 is similar to the action of the primary cyclone cleaner 118. The secondary accepts feed back into the pulp feed tank 110 through the conduit 154 and the secondary rejects feed into the static mixer 156 and tertiary standpipe 158 through the conduit 160. Thus, the secondary accepts are recycled back into the pulp feed tank, the primary cyclone cleaner 118 and the primary standpipe 126.

The secondary rejects from the secondary cyclone cleaner 152 are processed by the tertiary standpipe 158 yielding a foam which is discharged through the conduit 162. The foam level in the standpipe 158 is controlled by the valve 164 in the water supply line 166. The cleaned pulp is then transferred to the tertiary cyclone cleaner 168 by the pump 170 through the conduit 172. The tertiary rejects are discharged through the conduit 174 and the tertiary accepts are fed to the static mixer 138 of the secondary standpipe 140 through the conduit 176. The tertiary accepts are mixed with the primary rejects in the static mixer 138 before processing in the secondary standpipe 140.

Thus, the cleaning stages are arranged in a cascade arrangement for repeated cleaning and recycling of the pulp slurry through the various stages. The resulting pulp from the conduit 136 has a low dirt count and a high brightness.

The following nonlimiting examples are provided to further illustrate various features of the invention.

EXAMPLE 1

Office paper containing laser and xerographic printing was repulped by adding the paper to water at a temperature of about 160° F. in a hydrapulper at a water/paper weight ratio of about 94/6 with about 0.8 wt. % agglomerating agent calculated on the basis of the weight of the dry fiber and about 0.3 wt. % sodium hydroxide providing a pH of about 9.7. The agglomerating agent was a mixture of alcohols and nonionic surfactants. The pulp was then screened with a slotted screen having 0.006 in. slots, diluted to a consistency of about 0.5% and processed through a series of three centrifugal cleaner banks each followed by transfer through a standpipe prior to insertion into the next cyclone cleaner. The accepts stream and the rejects stream from the first cleaner stage went to separate standpipes. The cleaning stages were in a cascade arrangement, so that the primary stage rejects went to a standpipe and then were pumped to the secondary bank of cleaners. The secondary accepts went back to the primary feed tank, and the secondary rejects went to a standpipe, and then were pumped to the tertiary cleaner bank. The tertiary accepts went back to the standpipe feeding the secondary stage and the tertiary rejects were discarded (See FIG. 3). The standpipes were about 10 feet high and ranged in diameter from about 6 inches to about 2 feet depending on the mass flow rate so that the downward flow was about 0.5 ft/sec. The standpipes were also equipped with level and flow controls. Ink particles in the slurry passed to the standpipes associated with air bubbles in the slurry, forming a froth on the upper surface, and the froth was removed continuously by overflowing the standpipes. The pulp consistency through the cleaners and standpipes was maintained at about 0.5%. The flow was introduced into each standpipe just below the upper surface in a manner so as to provide a descending spiral flow pattern countercurrent to the rising air bubbles.

The removed foam contained large amounts of ink and colored material. The foam removed from the standpipe feeding the tertiary cleaners had a brightness of 66.1 GE and a dirt count of 5230 ppm, and 9.6% of the ink or dirt particles were larger than 0.10 mm$^2$. By comparison, the discarded rejects from the tertiary cleaners had a brightness of 70.6 GE, a dirt count of 2070 ppm, and 31.5% of the ink particles were larger than 0.10 mm$^2$. Obviously, the foam was able to remove a very concentrated stream of ink having a low brightness and containing smaller ink particles than could be removed by the centrifugal cleaners. The pulp loss from the removed foam was approximately 1.6%. The final deinked pulp had a brightness of 79.5 GE and a dirt count of 8 ppm.

EXAMPLE 2

In accordance with Example 1, tests were run with and without foam overflow from the standpipes to compare the brightness increase obtained in the system of the invention. The results of the tests are shown in Table I.

TABLE I

|  | Pulp Brightness (GE) | | |
| --- | --- | --- | --- |
|  | At the Hydrapulper | Final Pulp | Difference |
| Without Standpipe Overflow (Control) | 76.2 | 78.7 | +2.5 |
| With standpipe Overflow | 74.4 | 79.5 | +5.1 |

As can be seen, the present invention provides a two fold improvement in brightness. Even though the pulp in the hydrapulper of the control system was initially brighter than the pulp in the hydrapulper of the present invention, the deinked pulp of the present invention was brighter than the deinked pulp of the control system. Also, green ink used on the computer printout paper which was being recycled resulted in a green shade of color in the final control pulp. However, the green color was removed when the foam overflow method was used, the removed foam had a distinct green color, and the accepted pulp had no visible green tint.

EXAMPLE 3

Computer printout paper printed with laser printers was processed in the hydrapulper according to Example 1. The pulp brightness in the hydrapulper was 75.5 GE with a brightness of the final deinked pulp of 80.0 GE, representing an improvement of 4.5 GE. The final dirt count of the deinked pulp was 20 ppm. The pulp was used on a paper machine to manufacture white printing and writing paper.

EXAMPLE 4

Post consumer office paper containing 5–10% laser and xerographic printing ink was repulped in a hydrapulper at 6% pulp consistency and 160° F. for 45 minutes. The pH was raised to 10 by addition of sodium hydroxide and the agglomerating agent of Example I was added at a 0.8% dosage. The pulp was dumped into a chest and then processed through a liquid cyclone cleaner to remove heavy contaminants, followed by processing through a slotted screen having a slot width of 0.006 in. The slotted screen accepts were pumped into a three stage centrifugal cleaning system with 6 in. diameter cleaners and having standpipes between the stages. The standpipes were equipped according to the standpipes of Example 1. The feed pulp consistency to the cleaners was about 0.5% and the consistency in the standpipes was reduced to about 0.4%. The flow was introduced into the standpipe just below the upper surface in a manner so as to provide a descending spiral flow pattern countercurrent to the rising air bubbles. The accepts pulp from the cyclone cleaners was processed through smaller diameter polishing cleaners, and then thickened for use on a paper machine. The final thickened pulp was very high quality having a brightness of 83.4 GE and a dirt count of 3 ppm. A large amount of ink and pigment was removed in the foam overflowing from the three standpipes. The brightness and dirt counts of the foam rejects in the standpipes are given in Table II.

TABLE II

| Standpipe | Foam Brightness (GE) | Foam Dirt Count (ppm) |
| --- | --- | --- |
| 1 | 70.0 | 1950 |
| 2 | 71.2 | 288 |
| 3 | 69.0 | 1850 |

By comparison, the final reject stream from the cyclone cleaners and the polishing cleaners contained a much less impressive concentration of ink and pigment as shown by their higher brightness and lower dirt counts. The cyclone cleaner rejects were 78.8 GE with a dirt count of 127 ppm while the polishing cleaner rejects had a brightness of 78.9 GE and a dirt count of 11 ppm. Thus, the method of the invention is much more effective than centrifugal cleaning alone in removing color and ink specks from the pulp.

Having thus described various preferred embodiments of the invention and several of its benefits and advantages, it will be understood by those of ordinary skill that the foregoing description is merely for the purpose of illustration and that numerous substitutions, rearrangements, and modifications may be made in the invention without departing from the scope and spirit of the appended claims.

What is claimed is:

1. A method for producing pulp for papermaking from waste printed paper which comprises mixing the waste printed paper in a pulping apparatus with a repulping solution which comprises water and an ink particle agglomerating agent under conditions which are sufficient to disintegrate the printed paper and provide a pulp slurry which includes water, wood fibers, relatively small ink particles of about or less than the size of the wood fibers and relatively large ink particle agglomerates substantially larger than the wood fibers, conducting the pulp slurry through a screen having openings therein which are dimensioned to block passage therethrough of relatively large ink particle agglomerates while allowing passage therethrough of water and wood fibers and at least a portion of relatively small ink particles providing a filtered pulp slurry including water, wood fibers and relatively small ink particles which passed through the openings of the screen in the slurry with the wood fibers and water, conducting the filtered pulp slurry through a cyclone cleaner to separate ink particles from the pulp slurry providing a cleaned pulp slurry including water, wood fibers and a reduced amount of relatively small ink particles as compared to the filtered pulp slurry, and a contaminated pulp slurry containing a higher concentration of ink particles, introducing gas bubbles into the cleaned or the contaminated pulp slurry, conducting either or both of the bubble-containing pulp slurries at a consistency of about or less than 1% through one or more elongate upright open top vessels over a residence time of 10 to 60 seconds from an entrance port to an exit port thereof, said entrance and exit ports vertically spaced apart and located adjacent upper and lower ends of the one or more vessels, the flow rate and flow conditions of the pulp slurry and dilution water through the one or more vessels being selected to maintain an upper surface level of the slurry in the one or more vessels adjacent its upper end at atmospheric pressure and to enable air bubbles in the slurry to rise to the upper surface, the air bubbles having ink particles associated therewith so as to generate a froth on the upper surface containing ink particles and ink particle agglomerates elevated to the surface in association with the air bubbles, and removing the froth from the upper surface, whereby the concentration of ink particles in the pulp slurry exiting the one or more vessels is substantially reduced as compared with that of the pulp slurry entering the one or more vessels.

2. The method of claim 1, wherein the step of introducing gas bubbles comprises mixing the cleaned or contaminated pulp slurry in a static mixer as the slurry is conveyed to the one or more vessels, and bleeding air into the mixer.

3. The method of claim 1, wherein the pulp slurry consistency is in the range of from about 0.3% to about 0.7% upon entering the one or more vessels.

4. The method of claim 1, wherein the net vertical flow velocity of the pulp slurry through the one or more vessels is in the range of from about 0.1 ft/sec. to about 2.0 ft/sec.

5. The method of claim 1, wherein the steps of conducting the filtered pulp slurry in a spiral flow path through a cyclone cleaner, introducing gas bubbles into the cleaned or contaminated pulp slurry, and conducting the bubble-containing cleaned or contaminated pulp slurry through the one or more elongate upright vessels are performed a plurality of times.

6. The method of claim 1, wherein the pulp slurry consistency is about 0.5% upon entering the one or more vessels.

7. The method of claim 1, wherein the one or more vessels is an elongate cylindrical standpipe having a total height in the range of from about 8 ft. to about 35 ft.

8. The method of claim 1, wherein the step of conducting the pulp slurry through the one or more vessels includes directing the pulp slurry into the one or more vessels at the entrance port adjacent the upper end of the one or more vessels in such a manner as to cause the slurry to flow downwardly through the one or more vessels in a spiral flow pattern and then directing the slurry out of the exit port adjacent the lower end of the one or more vessels wherein relatively small ink particles in the slurry associate with upwardly flowing gas bubbles and are raised to the upper surface.

9. The method of claim 1, wherein the step of introducing air bubbles to the cleaned or contaminated pulp slurry is accomplished by the natural turbulence associated with conveying the pulp slurry to the one or more vessels from the hydrapulper and any dilution of the slurry.

10. A method for producing pulp for papermaking from waste printed paper which comprises:

(1) mixing the waste printed paper in a pulping apparatus with a repulping solution which comprises water and an ink particle agglomerating agent under conditions which are sufficient to disintegrate the printed paper and provide an initial pulp slurry which includes water, wood fibers, relatively small ink particles of about or less than the size of the wood fibers and relatively large ink particle agglomerates substantially larger than the wood fibers;

(2) screening the pulp slurry to separate relatively large ink particle agglomerates therefrom and produce a screened pulp slurry which is passed to a pulp feed tank;

(3) conducting the screened pulp slurry from the pulp feed tank through a first cleaning stage including:

(a) conducting the screened pulp slurry through a first cyclone cleaner to separate ink particles from the pulp slurry to produce a first cyclone cleaner accepts pulp slurry including water, wood fibers and a reduced amount of relatively small ink particles as compared to the initial pulp slurry, and a first cyclone cleaner rejects pulp slurry including water, wood fibers and relatively small ink particles, (b) introducing gas bubbles into the first cyclone cleaner accepts pulp slurry, (c) conducting the first cyclone cleaner accepts pulp slurry at a consistency of about or less than 1% through one or more first elongate upright vessels over a residence time of 10 to 60 seconds from an entrance port to an exit port thereof, wherein the entrance and exit ports of the elongate upright vessels are vertically spaced apart and located adjacent upper and lower ends of the one or more vessels, the flow rate and flow conditions of the pulp slurry and dilution water through the one or more vessels are selected to maintain an upper surface of the slurry in the one or more vessels adjacent their upper end and to enable gas bubbles in the slurry to rise to the upper surface, the gas bubbles having ink particles associated therewith so as to generate a froth on the upper surface containing ink particles and ink particle agglomerates elevated to the surface in association with the gas bubbles, (d) removing the froth from the upper surface, and
(e) conducting the cleaned pulp slurry from the exit port of the one or more first elongate upright vessels for further processing into pulp for papermaking;

(4) conducting the first cyclone cleaner rejects pulp slurry through a second cleaning stage producing a second cyclone cleaner accepts pulp slurry which is conducted back to the pulp feed tank and a second cyclone cleaner rejects pulp slurry which is conducted to a third cleaning stage, the second cleaning stage including:
  (a) introducing gas bubbles into the first cyclone cleaner rejects pulp slurry,
  (b) conducting the first cyclone cleaner rejects pulp slurry at a consistency of about or less than 1% through one or more second elongate upright vessels from an entrance port to an exit port thereof,
  (c) removing the froth from the upper surface,
  (d) conducting the cleaned pulp slurry from the exit port of the one or more second elongate upright vessels through a second cyclone cleaner to separate ink particles from the pulp slurry,
  (e) producing a second cyclone cleaner accepts pulp slurry including water, wood fibers and a reduced amount of relatively small ink particles as compared to the first cyclone cleaner rejects pulp slurry,
  (f) producing a second cyclone cleaner rejects pulp slurry including water, wood fibers and relatively small ink particles, and
  (g) conducting the second cyclone cleaner accepts pulp slurry back to the pulp feed tank; and (5) conducting the second cyclone cleaner rejects pulp through a third cleaning stage producing a third cyclone cleaner accepts pulp slurry which is conducted back to the first or second cleaning stage and a third cyclone cleaner rejects pulp slurry, the third cleaning stage including:
  (a) introducing gas bubbles into the second cyclone cleaner rejects pulp slurry,
  (b) conducting the second cyclone cleaner rejects pulp slurry at a consistency of about or less than 1% through one or more third elongate upright vessels over a residence time of 10 to 60 seconds from an entrance port to an exit port thereof, wherein the entrance and exit ports of the elongate upright one or more third vessels are vertically spaced apart and located adjacent upper and lower ends of the one or more third vessels, the flow rate and flow conditions of the pulp slurry and dilution water through the one or more third vessels are selected to maintain an upper surface of the slurry in the one or more third vessels adjacent their upper end at atmospheric pressure and to enable gas bubbles in the slurry to rise to the upper surface, the gas bubbles having ink particles associated therewith so as to generate a froth on the upper surface containing ink particles and ink particle agglomerates elevated to the surface in association with the gas bubbles,
  (c) removing the froth from the upper surface,
  (d) conducting the cleaned pulp slurry from,the exit port of the one or more third elongate upright vessels through a third cyclone cleaner to separate ink particles from the pulp slurry, to produce a third cyclone cleaner accepts pulp slurry including water, wood fibers and a reduced amount of relatively small ink particles as compared to the second cyclone rejects pulp slurry, and a third cyclone cleaner rejects pulp slurry including water, wood fibers and relatively small ink particles, and
  (e) conducting the third cyclone cleaner accepts pulp slurry back to the first or second cleaning stage.

* * * * *